Dec. 24, 1940.  C. SMESNE  2,226,327
AXLE STRUCTURE
Filed Oct. 24, 1939
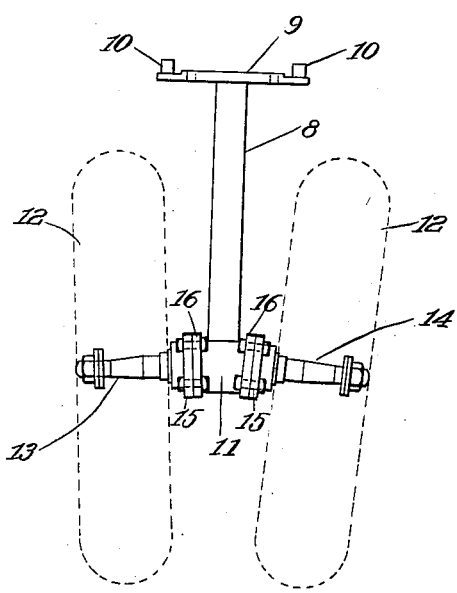
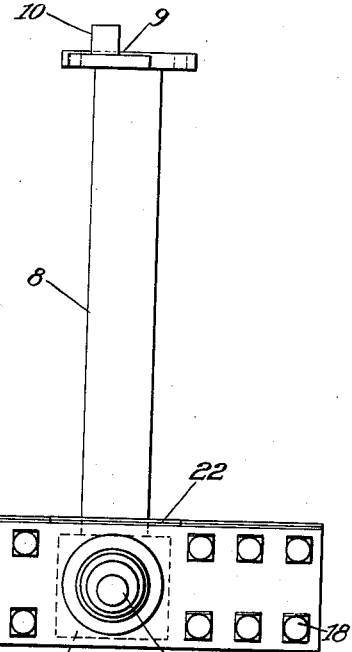
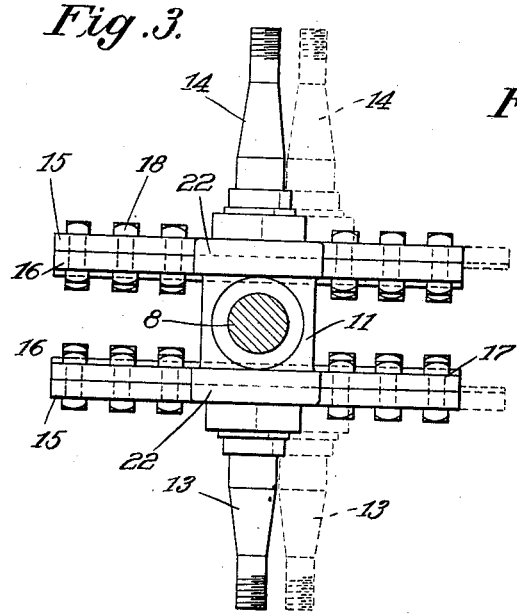
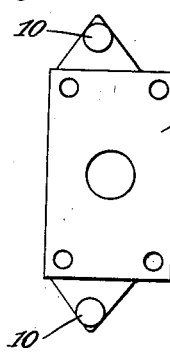
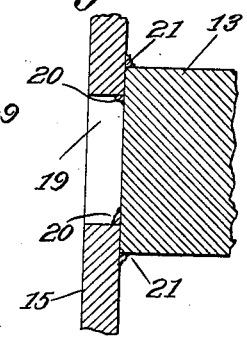
Carl Smesne
INVENTOR
BY *Victor J. Evans & Co.*
ATTORNEYS Patented Dec. 24, 1940

2,226,327

UNITED STATES PATENT OFFICE 2,226,327

AXLE STRUCTURE

Carl Smesne, Mabton, Wash.

Application October 24, 1939, Serial No. 301,030

3 Claims. (Cl. 280—96.1)

The present invention relates to improvements in axle structures.

The primary object of the invention resides in the provision of an axle structure designed primarily for farm tractors adapted to offset and remove the jar present in the steering mechanism as such tractors are moved over rough and uneven ground.

Certain types of farm tractors are equipped with a single or a pair of relatively small wheels mounted on a front axle to be employed in steering the tractor. In the types employing a pair of steering wheels, such wheels are usually disposed at an angle to the steering column. Where a pair of wheels are employed, it is necessary to use double axles extending from opposite sides of the base of the steering column. By means of the present invention the double axles can be made stationary relative to the center of the base of the steering column or adjustments made to accommodate the axles being positioned in front of or to the rear of the steering column.

Thus a further object of the invention is to provide a means for adjusting the double axles of the front or steering wheels of a farm tractor for aiding in eliminating jar occasioned by the travel of the tractor over rough or uneven ground.

With the foregoing and other objects in view, the invention consists of the novel construction, combination and arrangement of parts as will be more specifically described and/or as illustrated in the accompanying drawing, wherein there is shown the preferred embodiment of the invention.

In the drawing, Figure 1 is a front elevational view showing the adaptation of the invention with the steering column of a farm tractor, Fig. 2 is an end elevational view thereof, Fig. 3 is a top plan view with the steering column being shown in section, Fig. 4 is a top plan view of the coupling member forming a part of the steering column, and Fig. 5 is a detailed sectional view illustrating the manner of attaching one of the adjusting plates to an axle.

Referring to the drawing for a more detailed description thereof, the steering column of a farm tractor is generally designated by the reference numeral 8, the upper end of which carries a plate 9 formed with upstanding lugs 10 for attaching the steering column to the steering mechanism of a tractor, not shown. The lower end of the steering column 8 is formed with a substantially square shaped carrier 11 to which is normally attached the axles supporting the ground engaging steering wheels 12.

In accordance with the present invention a special means has been devised for associating the axles 13 and 14 respectively, with the carrier 11 and to provide for relative adjustment of the axles with respect to the carrier. Referring more particularly to Fig. 3 of the drawing, it will be noted that there is provided a pair of plates 15 and 16 respectively, of uniform size and formed of a relatively hard and durable material. Both plates are formed with a multiplicity of spaced openings 17 for the reception of bolts or similar fastening means 18 for adjustably securing said plates to the carrier 11. The outer plates 15 support the inclined axles 13 and 14, said axles being electrically welded thereto. As more clearly shown in Fig. 5 of the drawing, an opening 19 is formed in the plate 15 and substantially centrally thereof to permit the admission of a welding tool whereby said plate may be welded to the axle at the points indicated by the reference numeral 20. An outside weld of the axle end plate is formed at the points indicated by the numeral 21 which provides for a secure bond between the axle and the plate.

The inner plates 16 are similarly bonded to opposed faces of the carrier 11 and, when united with the plates 15 in the manner shown in Fig. 3 of the drawing, the respective axles 13 and 14 are downwardly inclined for supporting the wheels 12 in the manner shown in Fig. 1. However, when desiring to position the axles in front of or to the rear of a steering column 8, the fastening members 18 are removed and the plates 15 moved longitudinally to the front or the rear of the stationary plates 16. In Fig. 3 of the drawing there is shown in dotted lines the position of the axles 13 and 14 and the plates 15 when said plates have been moved to the rear of the steering column 8, and it will be readily seen that the position of the wheels 12 supported on the axles will be likewise changed relative to the steering column 8.

The inner plates 16 have welded or otherwise secured thereto a plate 22 slidably supported on the outer plates 15, the plate 22 being adapted to center the openings of the plates 15 for quick adjustment.

It is to be understood of course that this invention is capable of extended application and is not confined to the precise illustrated forms nor described construction and, therefore, such changes and modifications may be made therein as do not affect the spirit of the invention nor exceed the scope of the appended claims.

Having thus described the present invention, what it is desired to secure by Letters Patent is:

1. In an axle structure for the steering wheels of a farm tractor, a carrier block secured to one end of a steering post, the opposed faces of said carrier block having plates attached thereto, complementary plates supporting axles thereon attached to said first mentioned plates, and means whereby said complementary plates are slidable relative to said first-mentioned plates for adjusting the position of said axles relative to said steering post.

2. In an axle structure for the steering wheels of a farm tractor including a steering column, a carrier block forming a part of one end of said column, a plate secured to opposed faces of said carrier block, said plate being formed with a multiplicity of spaced openings, and means for adjustably attaching oppositely disposed axles to said carrier block, said means including complementary plates supporting the axles thereon and formed with spaced openings for alignment with the openings formed in said first mentioned plates to receive fastening means, said complementary plates being longitudinally movable relative to said first-mentioned plates to position said axles in front of or to the rear of said steering post.

3. In an axle structure for the steering wheels of a farm tractor, a carrier block secured to one end of a steering post, the opposed faces of said carrier block having plates attached thereto, complementary plates supporting axles thereon adapted to be adjustably attached to said first mentioned plates, and means carried on the upper face of said first mentioned plates adapted to be slidably supported on said second mentioned plates whereby rapid adjustment of said plates is accomplished.

CARL SMESNE.